F. M. BOWEN.
DIRECTION INDICATOR FOR AUTOMOBILES.
APPLICATION FILED JUNE 10, 1916.

1,223,250.

Patented Apr. 17, 1917.

Witnesses
Chas. H. Trotter
W. F. Davidson

Inventor
F. M. Bowen
By
A. Randolph Jr.
Attorney

UNITED STATES PATENT OFFICE.

FRANK M. BOWEN, OF SYRACUSE, NEW YORK.

DIRECTION-INDICATOR FOR AUTOMOBILES.

1,223,250.      Specification of Letters Patent.      Patented Apr. 17, 1917.

Application filed June 10, 1916. Serial No. 102,910.

*To all whom it may concern:*

Be it known that I, FRANK M. BOWEN, a citizen of the United States, residing at Syracuse, in the county of Onondaga and State of New York, have invented certain new and useful Improvements in Direction-Indicators for Automobiles; and I do hereby declare the following to be a full, clear, and exact description of the invention, such as will enable others skilled in the art to which it appertains to make and use the same.

This invention relates to new and useful improvements in a direction indicator for automobiles and one of its objects is the provision of a device of this character, which shall be simple, durable and efficient and which may be manufactured and sold at a comparatively low cost.

Another object of this invention is to provide a pair of hands rotatably supported at each side of the wind shield of an automobile, in clear view to traffic in front and in the rear thereof and adapted to be rotated to a vertical position or signaling position, to indicate that the operator of the automobile intends to make a stop or turn to the left or right.

A further object of this invention is to provide controlling levers upon the steering post of an automobile to rotate the hands from a horizontal position to a vertical or signaling position to indicate the intended turn of the automobile.

A still further object of this invention is to provide a tension means for normally holding the hands in a horizontal position and further provide means for locking the controlling levers against the tension means to hold the hands in signaling or vertical position when desired.

With these and other objects in view as will become more apparent as the description proceeds, the invention consists in certain novel features of construction, combination and arrangement of parts as will be hereinafter more fully described and claimed.

Figure 1:
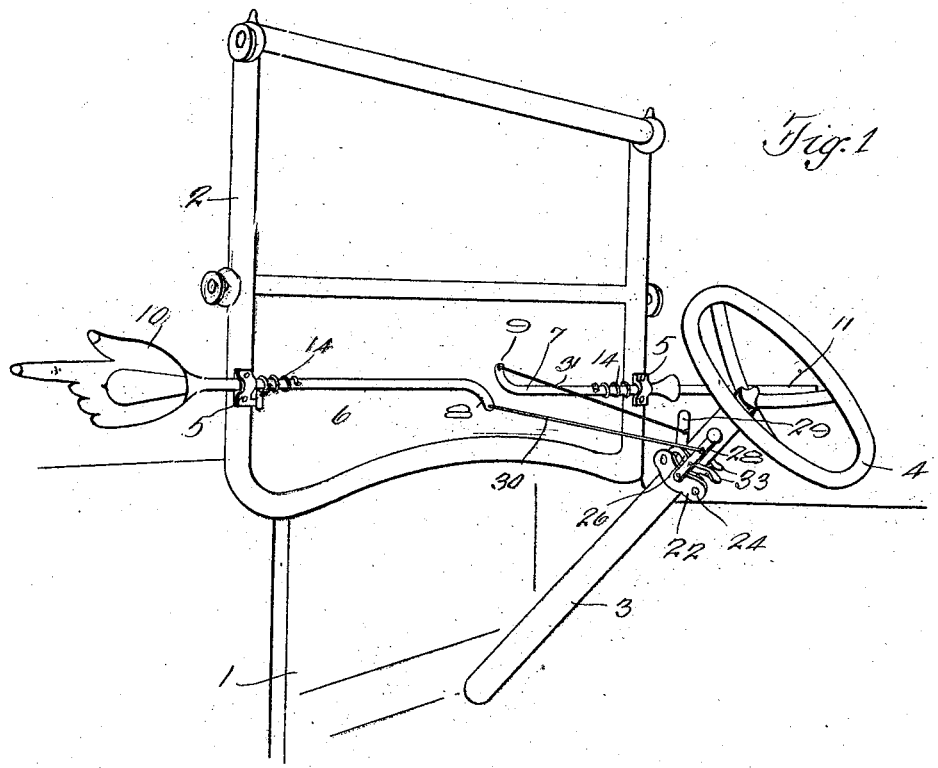
Figure 2:
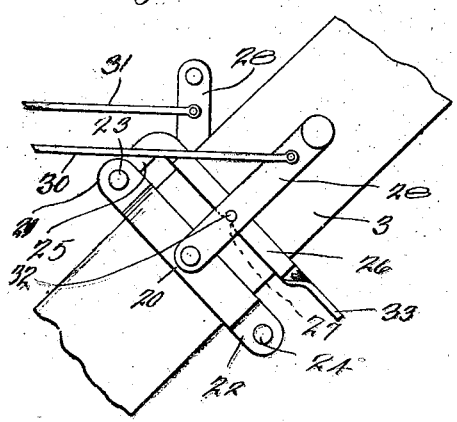

For a complete understanding of my invention, reference is to be had to the following description and accompanying drawing, in which:

Figure 1 is a perspective view of a direction indicator applied to an automobile and constructed in accordance with my invention, Fig. 2 is a side elevation of the controlling levers, illustrating the means of attaching them to a steering post and the means of locking them in a signaling position.

Referring in detail to the drawing, the numeral 1 indicates the front dash of an automobile, having a wind shield 2 secured thereto and 3 a steering post supporting a steering wheel 4, to which my invention is applied.

Secured to each side of the wind shield 2 are brackets 5, in which are journaled hollow cylindrical rods 6 and 7 having their inner ends bent at right angles to form operating arms 8 and 9. A pair of hands 10 and 11 of metal or other suitable material are secured to the outer ends of the rods 6 and 7 and are apertured in the palm portions to receive electric lamps 12, which are threaded in sockets 13 formed in the wrist portions of the hands 10 and 11. Surrounding the rods 6 and 7 are coil springs 14 having one of their ends secured to the rods 6 and 7 and their other end secured to the brackets 5 to provide a tension means for normally holding the hands 10 and 11 in a horizontal position as illustrated by the hand 11 in Fig. 1.

Secured to the steering post 3 is a split collar 20, having ears 21 and 22 formed thereon and apertured to receive bolts or pins 23 and 24, for clamping the split collar 20 at any desired position upon the steering post 3. An arm 25 is pivoted on the bolster pins 23 and has a collar 26 formed thereon and surrounding the steering post 3 at a point above the split collar 20. The collar 26 is of larger dimension than the steering post 3 to allow it to be moved on its pivot upwardly and downwardly of the steering post 3 and is provided with slots 27 adjacent the lower edge thereof and upon each side.

Pivoted to the split collar 20 are controlling levers 28 and 29 which extend upwardly from the split collar 20 and have links 30 and 31 secured thereto, which are connected to the operating arms 8 and 9 respectively. Each of the controlling levers 28 and 29 have inwardly extending pins 32 upon which the collar 26 rides. The collar 26 is provided with a handle 33 for raising it upwardly when desired.

In operation, the controlling levers 28 and 29 are normally in a forward position as shown by the controlling lever 29 in Figs. 1 and 4, being held in such a position under the tension of the springs 14, in which position the hands 10 and 11 are in a horizontal position indicating to the traffic that the automobile is going to continue a straight path. When the operator desires to indicate that he is going to turn to the left, he pulls the controlling lever 28 against the tension of the springs 14 and the hand 10 will assume a vertical position as illustrated in Fig. 1 and be illuminated by the contact plate 15 on the rod 6 coming in contact with the respective contact plate 19, clearly attracting the attention of the traffic in the rear and front of the automobile, letting them know his intention of travel. The controlling lever 28 when pulled rearwardly will cause the collar 26 to rise upwardly and travel upon the pin 32 until it reaches the slot 27, allowing the collar 26 to drop downwardly and lock the controlling lever 28 in a rearward or signaling position, thus leaving the operator's hands free to control the machine when making the turn. After the turn has been made the operator grips the handle 33 and raises the collar 26, allowing the controlling lever 28 to return to a forward or unsignaling position by the tension of the respective springs 14. To indicate to the traffic that the turn is to be made to the right, the controlling lever 29 is pulled rearwardly in the same manner as heretofore described in the operation of the controlling lever 28 and it is therefore not thought necessary to repeat the steps heretofore mentioned in operating the left hand signal.

In order to indicate to the traffic that a full stop is about to be made, both controlling levers 28 and 29 are pulled rearwardly and locked by the collar 26.

While I have shown and described the preferred embodiment of my invention, it will be understood that minor changes in construction, combination and arrangement of parts may be made without departing from the spirit and scope of the invention as claimed.

Having thus described my invention, what I claim is:—

A direction indicator comprising a signaling rod adapted to be journaled to a windshield, a link connected to the rod, a split collar adapted to be secured to a steering post, an upwardly extending lever pivoted to said collar and to the link for operating the signaling rod, a pin secured to the lever, a collar pivoted to the first mentioned collar and having a notch to receive the pin, for locking the lever against movement, and a handle formed on the second mentioned collar for swinging said collar upon its pivot to free the lever.

In testimony whereof I affix my signature in presence of two witnesses.

FRANK M. BOWEN.

Witnesses:
 MADGE J. BOWEN,
 GEO. B. PALTZ.